United States Patent [19]

Carley et al.

[11] Patent Number: 4,472,285
[45] Date of Patent: Sep. 18, 1984

[54] SOLIDS REMOVAL FROM BRINE

[75] Inventors: David R. Carley; Warren B. Kirsch, both of Baton Rouge, La.

[73] Assignee: Ethyl Corporation, Richmond, Va.

[21] Appl. No.: 408,035

[22] Filed: Aug. 13, 1982

[51] Int. Cl.$^3$ .............................................. B01D 21/01
[52] U.S. Cl. ..................................... 210/737; 75/109; 210/912; 210/917; 423/140
[58] Field of Search .................. 75/109; 210/702, 708, 210/714, 722, 737, 912, 719, 917; 423/170

[56] References Cited

U.S. PATENT DOCUMENTS

| | | | |
|---|---|---|---|
| 1,429,131 | 9/1922 | Field | 75/109 |
| 1,557,188 | 10/1925 | Newlands | 75/109 |
| 1,792,262 | 2/1931 | Wilson | 75/109 |
| 2,204,224 | 6/1940 | Limerick et al. | 252/8.55 B |
| 2,655,472 | 10/1953 | Hilliard et al. | 75/109 |
| 2,754,174 | 7/1956 | Roberts | 423/140 |
| 3,933,478 | 1/1976 | Moore | 75/109 |
| 4,096,064 | 6/1978 | du Fresne | 210/912 |

Primary Examiner—Peter A. Hruskoci
Attorney, Agent, or Firm—Donald L. Johnson; John F. Sieberth; Teresa M. Stanek

[57] ABSTRACT

A process for removing solids forming iron impurities from a high density brine. The presence of these impurities in the generally clear brine oftentimes results in a green or brown color. Zinc dust is added to the brine to precipitate the iron impurities.

12 Claims, No Drawings

SOLIDS REMOVAL FROM BRINE

BACKGROUND OF THE INVENTION

1. Field of the Invention

The present invention is directed to a method for removing solids or solids forming iron impurities from a solution. More particularly, this invention is a process for removing iron impurities from clear, high density brines used in oil or gas wells by precipitating the iron with zinc metal.

2. Description of the Prior Art

Clear, high density brines are used in oil well completions and workovers. They are also used as oil well packer fluids. Packer fluids are the fluids which are left in the annular space between the tubing and casing of oil wells. The primary purpose of these fluids is to balance the pressure in the well so as to prevent a well "blow out" without losing the fluid to the formation, and without damaging the formation as is done when solids-laden fluids are used. The densities required by these brines are determined by the well pressures and depths.

Oil well brines are usually prepared by blending different amounts and types of salt solutions to get the required density and clarity at the lowest cost. Such brines must be clear, that is, free of solids or solids forming materials such as iron. If iron is present in these brines, there may be an abnormally high color level and undesirable precipitates of compounds such as iron hydroxides. This precipitation phenomena may occur upon aging or sometimes upon blending various brines to obtain a desired density. Formation of green solutions containing a green precipitate of gelatinous ferrous hydroxide have been observed. Dark brown solutions may be caused by ferric ions.

These color related problems, caused by the presence of iron in brine, may have originated in the brine manufacturing process. Iron may have been present in the starting materials. Alternatively, the iron impurities may be "picked-up" during shipping, storing, handling or during the use of the brine "downhole" in a hot oil well.

It is economically advantageous to be able to treat new or used brine in a manner which removes iron impurities such that the treated brine can be used in an oil well. This treated brine may require the addition of other salts or salt solutions to obtain the desired density.

SUMMARY OF THE INVENTION

Accordingly, an object of the present invention is to remove solids or solids forming iron impurities such as iron from brine using zinc. The brine solutions may be recently prepared or solutions that will be recycled.

DESCRIPTION OF THE PREFERRED EMBODIMENTS

This invention is directed to a process for removing iron impurities from a solution, said process comprising adding zinc metal or a mixture containing zinc metal to a solution containing iron impurities at a temperature of at least 25° C. in an amount sufficient to precipitate said iron impurities from said solution and separating said precipitate from said solution.

Any solution containing undesirable color-causing iron impurities may be treated in the manner taught by the present invention. The iron imparts a green and/or brown color to the solution depending on whether the iron is in the form of a ferrous or ferric ion.

Typical salts found in brine used in oil wells include calcium chloride, calcium bromide, zinc chloride, zinc bromide, sodium chloride, sodium bromide, potassium chloride, potassium bromide, and the like, including mixtures thereof. Impurities may arise in the preparation of a brine. Oftentimes, the impurities do not cause a noticeable color change until the brine is blended with another salt solution. The purpose of the blending procedure is to obtain a solution having a specific density. The density is determined by the amount of each salt present. Due to the relatively high cost of high density brine, there is a strong motivation to reuse the solution. However, recovered brine, having been downhole in an oil well, frequently contains impurities, especially iron, which renders it unsuitable for re-use.

Care should be used when adding zinc to certain solutions. If zinc metal is added to an acid solution, hydrogen gas may be evolved which can form explosive mixtures with air, and such mixtures can be ignited by a spark from many sources such as electrical motors, cigarettes, static charges, and the like.

The zinc used in the practice of the present invention may be in any metallic form. However, the preferred form of zinc is either granular zinc or zinc dust. The most preferred form of zinc to be used in the practice of the present invention is zinc dust. Zinc dust has a high surface area which improves reactivity.

Use of zinc metal to treat the brine solution has a distinct advantage over treating the brine with some other metal that might precipitate iron. An equivalent amount of zinc will dissolve in the brine. However, this is not harmful because zinc salts are often used in making commercial completion fluids. Other metal salts commonly used in making oil well brines include sodium and calcium salts. However, use of sodium or calcium metal to precipitate iron is not practical because these metals can react with water forming hydrogen and metal hydroxides.

The amount of zinc should be sufficient to precipitate the color-causing impurities from solution. The preferred amount of zinc used in the practice of the present invention is dictated by the amount and type of impurities present in the solution and the reaction conditions selected. If the process is carried out within the preferred temperature range, a lower amount of zinc can be used compared to the amount of zinc necessary at ambient temperatures. Theoretically, 1.5 atoms of zinc are necessary for each ferric ion in the solution and 1 atom of zinc is necessary for each ferrous ion in the solution. In practice, the amount of zinc used in brines typically ranges from about 0.5 to about 100 atoms of zinc per atom of iron. Generally, 1.0 to 40 atoms of zinc are used for each atom of iron present in the solution. An excess of zinc over theoretical is generally used to increase the reaction rate. Also, impurities other than iron which are present in the brine may be removed along with the iron. Any excess zinc present in the solution is easily separated from the brine after treatment with the zinc.

The brine may be filtered prior to the zinc treatment. Prefiltering can reduce the iron content of the impure solution significantly, depending on how much is suspended, that is, not in a true solution. The amount of zinc used to treat the filtered solution can be reduced accordingly.

As indicated, impurities other than iron may be removed from brine by the practice of the present invention. Other side reactions and impurities may occur during the manufacturing process or after the brine is used downhole in an oil well. An exact identification of the color causing impurities contained in the brine is not necessary in the practice of the present invention. Typical metal impurities that can be removed from brine include nickel, lead, tin, copper, and the like.

The reaction is conducted at a temperature high enough to precipitate the color-causing impurities such as iron from the solution, yet not so high as to adversely affect the course of the reaction. The reaction can occur at room temperature but heating is needed to get a more rapid reaction, especially as the level of impurities, such as iron, start to decrease. The process of the present invention is carried out at a temperature of at least 25° C. Preferably, the temperature will be in the range of about 25° C. to about 250° C. Even more preferably, the temperature will be in the range of about 50° C. to about 150° C.

In general, the reaction is conducted under ambient pressures since these are most economical. However, reaction pressure is not critical. The reaction time is not critical, but depends to some extent on the inherent reactivity of the reactants and other reaction conditions employed such as temperature. The brine should be stirred with the zinc metal for a time sufficient to lower the iron content to an acceptable level. IN general, reaction times from a few minutes to a few days are sufficient. However, if the amount of zinc and reaction temperature are carefully selected, within a matter of 30 minutes a precipitation of most of the impurities contained in the brine can be achieved.

The following examples illustrate the process of removing solids and solid forming impurities from brine solutions according to the present invention. These examples are in no manner intended to limit the invention described.

EXAMPLE 1

A dark green brine containing a green gelatinous precipitate was recovered after being "downhole" in an oil well. The fluid was analyzed and found to contain approximately 9.93 weight percent zinc, 43.33 weight percent bromine, 6.86 weight percent calcium, 3.04 weight percent chlorine and 0.11 weight percent iron. The approximate composition of the brine based on the above analysis was 34.2% zinc bromide, 23.8% calcium bromide, 4.8-5.8% calcium chloride and 36.2-37.2% water. There were 1100 parts per million (ppm) of dissolved plus suspended iron impurity in the solution. Approximately 6.0370 grams of zinc dust (representing 1½ atoms zinc per atom of iron) was added to 3126 grams of the above brine. The mixture was stirred and heated to 80° C. for 30 minutes. The green color disappeared and the mixture took on a more definite brown appearance. Free magnetic iron was noted. Another 2.0124 grams of zinc dust was added and the mixture was stirred for another 30 minutes at 80° C. The mixture was filtered and the filtrate was gold in color with a slight haze. The final iron content was 23 ppm.

This filtrate containing 23 ppm iron did not form a green color or precipitate when blended with calcium bromide solution and calcium chloride solid to adjust its density for re-use.

EXAMPLE 2

Into a 1 quart clear bottle was placed 1764 grams of the original used brine described in Example 1 (containing 1100 ppm iron) and 4.54 grams of zinc dust (2 atoms zinc per atom of iron). The mixture was stirred at 26° C. The maximum temperature was 27.5° C. After four hours the stirring was stopped and the mixture filtered. This filtrate was a light brown color. Analysis indicated an iron content of 350 ppm.

To 1532 g of this filtrate (containing 350 ppm iron) was added 1.2550 grams zinc and the mixture was stirred 4 hours at ambient temperature (27° C.). After filtering, the solution was yellow to brown (not noticeably different from the first filtrate) and contained 300 ppm iron.

Approximately one to two grams of zinc dust was added to the second filtrate. The mixture was stirred and heated to 80° C. Within 15 minutes, black particles appeared in the mixture which were attracted to a magnet. The heating time was 30 minutes. The mixture was then filtered. The filtrate was analyzed and found to have an iron content of 183 ppm. This indicates that heat treatment along with the addition of additional zinc significally improves the rate of iron removal.

EXAMPLE 3

A brine containing a green gelatinous precipitate was recovered after being "downhole" in an oil well. The brine contained zinc bromide, calcium bromide, and calcium chloride. The brine solution contained 276 ppm iron. The solution was filtered through diatomaceous earth and appeared hazy or cloudy after filtration and was yellow-brown or amber in color. The filtrate had a density of 17.8 lb/gal and contained 248 ppm iron.

A sample of the filtrate was allowed to stand and eventually green, gelatinous solids appeared. Another sample of the filtrate was mixed with calcium bromide solution and calcium chloride solid. This mixture immediately resulted in a precipitation of green, gelatinous solids from the filtrate.

Approximately 398 grams of the original filtrate was treated with 0.65 gram of zinc powder (5.6 atoms zinc per atom of iron). The mixture was stirred for 30 minutes while heating to 81° C. The mixture was filtered and a yellow-brown solution resulted which contained 161 ppm iron. This filtrate was mixed with calcium bromide solution and calcium chloride solid. A small amount of green gelatinous solids precipitated from solution.

Approximately 228.5 g of a sample of the filtrate that had already been treated once with zinc powder was treated with an additional 1 gram of zinc powder (23 atoms zinc per atom of iron). The mixture was stirred and heated at 80°-82° C. for 2 hours. Filtration of the mixture produced a filtrate with a very light yellow color and which contained 2 ppm iron. When this filtrate was mixed with calcium bromide solution and calcium chloride solid, no green solids appeared.

We claim:
1. A process for removing iron impurities from a brine containing color causing iron impurities, said brine containing at least one salt selected from the group consisting of calcium chloride, calcium bromide, zinc chloride, zinc bromide, sodium chloride, sodium bromide, potassium chloride, potassium bromide and mixtures thereof, said process comprising:
   adding granular zinc or a mixture containing granular zinc to said brine containing color causing iron impurities at a temperature of at least 25° C. in an amount sufficient to precipitate said iron impurities from said brine and separating said precipitate from said brine.

2. A process, as recited in claim 1, wherein said temperature is within the range of about 25° C. to about 250° C.

3. A process, as recited in claim 2, wherein said temperature is within the range of about 50° C. to about 150° C.

4. A process, as recited in claim 1, wherein said precipitate is separated from said solution by filtration.

5. A process, as recited in claim 1, wherein the amount of said granular zinc is within the range of about 0.5 to about 100 atoms of zinc per atom of said iron impurity.

6. A process, as recited in claim 5, wherein the amount of granular zinc is within the range of about 1.0 to about 40 atoms of zinc per atom of said iron impurity.

7. A process for removing solids forming iron impurities from a high density brine containing color causing iron impurities used in oil wells, said brine containing at least one salt selected from the group consisting of calcium chloride, calcium bromide, zinc chloride, zinc bromide, sodium chloride, sodium bromide, potassium chloride, potassium bromide and mixtures thereof, said process comprising:

adding zinc dust to said brine at a temperature of at least 25° C. in an amount sufficient to precipitate said color causing iron impurities from said brine and separating said precipitate from said brine.

8. A process, as recited in claim 7, wherein said temperature is within the range of about 25° C. to about 250° C.

9. A process, as recited in claim 8, wherein said temperature is within the range of about 50° C. to about 150° C.

10. A process, as recited in claim 9, wherein said precipitate is separated from said solution by filtration.

11. A process, as recited in claim 10, wherein said zinc dust is an amount sufficient to provide about 0.5 to about 100 atoms of zinc per atom of said iron impurity.

12. A process, as recited in claim 11, wherein said zinc dust is an amount sufficient to provide about 1.0 to about 40 atoms of zinc per atom of said iron impurity.

* * * * *